United States Patent Office 3,249,561
Patented May 3, 1966

3,249,561
FORMING A FOAMED POLYIMIDE ARTICLE
William Robert Hendrix, Buffalo, N.Y., assignor to E. I.
du Pont de Nemours and Company, Wilmington, Del.,
a corporation of Delaware
No Drawing. Filed Mar. 18, 1963, Ser. No. 266,065
11 Claims. (Cl. 260—2.5)

This invention relates to cellular structures of polyimides and a process for making them.

In the prior art, resinous compositions have been made into foams by physically mixing the molten or plasticized resin with gases or blowing agents. However, obtaining polyimide resins in the molten state is not easily possible since the resins are resistant to heat and tend to degrade before or during melting. Using a plasticizer is also difficult since the resins are quite resistant to most chemicals. In other words, the same outstanding physical and chemical properties that would make these foamed polymers extremely useful in the form of shaped cellular articles make it extremely difficult to obtain these articles in the first instance.

An object of the present invention is to form foamed polyimides and articles thereof. Other objects will appear hereinafter.

The objects are accomplished by first forming a solution containing at least one polyamide-acid having an inherent viscosity of at least 0.1, preferably 0.3–5.0; adding a lower fatty acid anhydride or an aromatic monobasic acid anhydride, preferably with a tertiary amine, to the solution; adding an acid selected from the group consisting of formic oxalic, trichloroacetic, malonic, citric and alpha-hydroxybutyric acids, preferably formic acid, to the solution; agitating the solution until gelation occurs to form a foamed polymeric composition; then shaping the foamed polymeric composition into a structure; and thereafter, heating the structure.

In the first step of this process, a polyamide-acid solution is prepared. The process for preparing the polyamide-acid solution involves reacting at least one organic diamine having the structural formula $H_2N-R'-NH_2$ wherein R' is a divalent radical containing at least 2 carbon atoms, the two amine groups of said diamine each attached to separate carbon atoms of said divalent radical; with at least one tetracarboxylic acid dianhydride having the structural formula

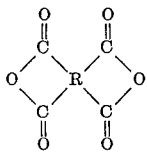

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature sufficient to provide a shapeable polymeric composition containing polyamide-acid.

It should be understood that it is not necessary that the polymeric component be composed entirely of the polyamide-acid. This is particularly true since conversion to the polyimide is contemplated subsequent to shaping. To retain its shapeability, it has been found that in most instances the polymeric component should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired and the minimum period of time that one desires for the reaction. For most combinations of diamines and dianhydrides falling with the definitions given above, it is possible to form polymeric components of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

Inherent viscosity =

$$\frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. For forming the shaped articles, it has been found that the most successful results are obtained when the solvent represents at least 60% of the final polymeric solution. That is, the solution should contain 0.05–40% of the polymeric component. The viscous solution of the polymeric composition containing polyamide-acid in the polymeric component dissolved in the solvent is the result of the first step.

The starting materials for forming the products of the present invention are organic diamines and tetracarboxylic acid dianhydrides. The organic diamines are characterized by the formula: $H_2N-R'-NH_2$, wherein R', the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorous, and substituted groups thereof. The preferred R' groups in the diamines are those containing at least 6 carbon atoms characterized by benzenoid unsaturation. Such R' groups include

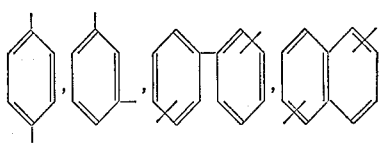

and

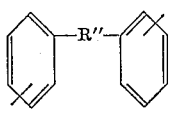

wherein R'' is selected from the group consisting of carbon in an alkylene chain having 1–3 carbon atoms, —O—, silicon in

and

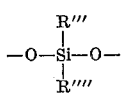

phosphorous in

and

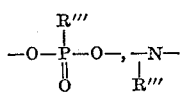

—S—, and —SO$_2$— wherein R''' and R'''' are alkyl or aryl. Among the diamines which are suitable for use in the present invention are:

Meta-phenylene diamine;
Para-phenylene diamine;
4,4'-diamino-diphenyl propane;
4,4'-diamino-diphenyl methane;
Benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
Bis-(4-amino-phenyl)diethyl silane;
Bis-(4-amino-phenyl) diphenyl silane;
Bis-(4-amino-phenyl)-N-methylamine;
1,5-diamino naphthalene;
3,3'-dimethyl-4,4'-diamino-biphenyl;
3,3'-dimethoxy benzidine;
2,4-bis(beta-amino-t-butyl) toluene;
Bis-(para-beta-amino-t-butyl-phenyl) ether;
Para-bis(2-methyl-4-amino-pentyl) benzene;
Para-bis-(1,1-dimethyl-5-amino-pentyl) benzene;
m-Xylylene diamine;
p-Xylene diamine;
Bis(para-amino-cyclohexyl) methane;
Hexamethylene diamine;
Heptamethylene diamine;
Octamethylenediamine;
Nonamethylene diamine;
Decamethylene diamine;
3-methylheptamethylene diamine;
4,4-dimethylheptamethylene diamine;
2,11-diamino-dodecane;
1,1-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
H$_2$N(CH$_2$)$_3$O(CH$_2$)$_2$O(CH$_2$)$_3$NH$_2$;
H$_2$N(CH$_2$)$_3$S(CH$_2$)$_3$NH$_2$;
H$_2$N(CH$_2$)$_3$N(CH$_3$)(CH$_2$)$_3$NH$_2$;
3,3'-dichlorobenzidine;
Bis-(4-amino-phenyl) ethyl phosphine oxide;
Bis-(4-amino-phenyl) phenyl phosphine oxide;
Bis-(4-amino-phenyl)-N-phenylamine; and
mixtures thereof.

The tetracarboxylic acid dianhydrides are characterized by the following formula:

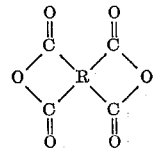

wherein R is a tetravalent organic radical selected from the group consisting of aromatic, aliphatic, cycloaliphatic, heterocyclic, combination of aromatic and aliphatic, and substituted groups thereof. However, the preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

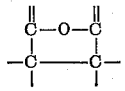

or

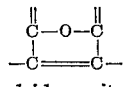

Illustrations of dianhydrides suitable for use in the present invention include:

Pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3-,4-dicarboxyphenyl) propane dianhydride;
Bis(3,4-dicarboxyphenyl) sulfone dianhydride;
3,4,9,10-perylene tetracarboxylic dianhydride;
Bis(3,4-dicarboxyphenyl) ether dianhydride;
Ethylene tetracarboxylic dianhydride;
Naphthalene-1,2,4,5-tetracarboxylic dianhydride;
Naphthalene-1,4,5,8-tetracarboxylic dianhydride;
Decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
Phenanthrene-1,8,9,10-tetracarboxylic dianhydride;
Cyclopentane-1,2,3,4-tetracarboxylic dianhydride;
Pyrrolidine-2,3,4,5-tetracarboxylic dianhydride;
Pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;

1,1-bis(3,4-dicarboxyphenyl) ethane dianhydride;
Bis(2,3-dicarboxyphenyl) methane dianhydride;
Bis(3,4-dicarboxyphenyl) methane dianhydride;
Bis(3,4-dicarboxyphenyl) sulfone dianhydride;
Benzene-1,2,3,4-tetracarboxylic dianhydride;
1,2,3,4-butane tetracarboxylic dianhydride;
Thio-phene-2,3,4,5-tetracarboxylic dianhydride;
3,4,3',4'-benzo-phenone tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the foamed polyamide-acid shaped articles by evaporation, displacement or diffusion. Other typical compounds of this useful class of solvents are: N,N-diethylformamide, N,N-diethylacetamide, N,N-dimethylmethoxy acetamide, N-methylcaprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

The next step involves adding to the polyamideacid composition a dehydrating agent alone or in combination with a tertiary amine, e.g. acetic anhydride or an acetic anhydride-pyridine mixture. The ratio of acetic anhydride to pyridine may vary from just above zero to infinite mixtures. It is believed that the pyridine functions as a catalyst for the action of the cyclyzing agent, the acetic anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids (ref. Bernthsen-Sudborough, textbook of Organic Chemistry, Van Nostrand, 1935, page 861, and Hackh's Chemical Dictionary, Blakiston, 1953, page 468), derived from drastic dehydration of the acids.

The aromatic monobasic acid anhydrides include the anhydride of benzoic acid and those of the following acids: o-, m- and p-toluic acids; m- and p-ethyl benzoic acid; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid; trimethoxy benzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts. The amine functions as a catalyst for the action of the cyclyzing agent, the anhydride.

In the next step, the gas-producing acid is added. Thus, the formic acid or one or more of the other acids mentioned previously, when added at this point, is decomposed in the presence of the anhydride or anhydride-tertiary amine mixture to produce carbon monoxide bubbles and/or carbon dioxide bubbles. In order to forestall the conversion of polyamide-acid to polyimide, the anhydride alone may be added and then the gas-producing acid may be added with the tertiary amine catalyst. The gas bubbles produced as the solution foams become uniformly dispersed in the solution. As the solution foams, polyamide-acid is being converted to polyimide.

The foamed solution is then shaped into a useful article, preferably prior to complete conversion to polyimide. Shaping may be accomplished by casting the foamed solution onto flat or curved surfaces to form sheets, films, etc. or by placing the foamed solution in molds of the desired shape. The foamed composition may also be coated on to substrates. In the next step, the solid foam article having minute air pockets or pores in place of the bubbles of the solution is dried and conversion to polyimide is completed by heating the article at about 300° C. for 0.5–3 hours depending upon the thickness of the article.

It has been found that these foams are improved by fast gelation. Fast gelation can be accomplished by using a substantial excess of chemical converting agent, the anhydride, over the amount required for converting polyamide-acid to polyimide. This excess can vary from 50% to 2000%.

By these methods foamed sheets from 5 mils to approximately 10 inches in thickness can be made readily. Densities of the foamed polyimides range from 0.01 g./cc. to 0.5 g./cc. Some are rigid and others are compressible, depending upon the thickness and the extent of foaming. Both open and closed cell foams can be made in this manner. Small amounts of the gas producing acid, e.g., formic acid (such as 0.03–0.05 mole per mole of polymer) give small bubble, low density foams of fairly high closed cell content, while larger amounts (such as 1.0 mole per mole of polymer) tend to produce larger bubbles and a more open cell network.

The products include low density, fireproof insulating structures of obvious utility for a variety of insulating and other protective purposes. These foamed products can be produced in the form of films, sheets, slabs, filaments, cylinders, etc., and in these forms can be laminated to other structures. The polyimides of the foam can contain electrically conductive particles, abrasive particles, pigments, etc. Carbon black, either electrically conductive or not, is a particularly useful additive.

Typical uses for the foamed products are cryogenic insulation, flameproofing (as in fire doors, fire fighting apparel and electric blankets), aircraft and missile insulation (ablation, radiation and heat shields), energy absorbers for use at extremes of temperature, microwave antenna enclosures, insulation for ovens and air conditioning equipment, gasketing, appliances requiring combined electrical insulation and flame-resistance, etc. In general, a wide variety of uses can be visualized because these foams provide a new degree of freedom in design wherever thermal stability, radiation-resistance and toughness are needed in addition to low density, resilience, flame and chemical resistance and electrical insulation.

The invention will be more clearly understood by referring to the examples which follow. These examples, which illustrate specific embodiments of the present invention, should not be construed to limit the invention in any way.

*Example 1*

A 12% by weight solution in N,N'-dimethylacetamide of the polyamide-acid of pyromellitic dianhydride and 4,4'-diamino-diphenyl ether was prepared in accordance with the disclosures in applications Serial No. 95,014, filed March 13, 1961, and Serial No. 169,120, filed January 26, 1962. A foamed sheet of this polyamide-acid was made continuously on a belt caster by adding formic acid at the rate of 1.0 mole/mole of polymer to the acetic anhydride (4.0 moles/mole of polymer) which was fed to an agitator, where, together with isoquinoline (0.5 mole/mole of polymer), they were mixed into the 12% by weight solution.

This solution was cast onto a moving belt in the form of a film about 60 mils thick. This film was allowed to foam, and then passed continuously into a pin drier, in which it was heated to about 400° C. to complete the conversion to polyimide and remove solvent.

The resulting 25–30 mil thick sheet had a density of 0.4 g./cc. and a dielectric strength of 8,000 volts. Thus, it was suitable as a slot insulator for electric motors.

*Example 2*

To 28 g. of a 15% solids solution of the polyamide-acid of pyromellitic dianhydride and 4,4'-diaminodiphenyl ether in N,N-dimethylacetamide was added 4.0 ml. of acetic anhydride and then 0.65 ml. of isoquinoline. After thorough mixing, 0.1 ml. of 98% formic acid (0.27 mole/mole of polymer) was added. After a brief interval of continued vigorous agitation, foaming commenced, followed in 5–10 min. by gelation. The foamed mixture was cast in the form of a cylinder, 2 inches in diameter and 3 inches long. This cylinder was dried without restraint for 1 hour at 300° C. to yield a stiff, tough, non-frangible foam of density 0.04 g./cc.

*Example 3*

Example 2 was repeated, using 0.45 ml. of 98% formic acid (1.22 moles/mole of polymer). Foaming occurred almost immediately. After drying for 1 hour at 300° C. the product had a very open network of relatively large pores. Its density was 0.1 g./cc. and it was strong and tough.

*Example 4*

To a 0.01 mole sample of the polyamide-acid made from 4.4'-diaminodiphenyl ether and pyromellitic dianhydride (as a 15% by weight solution in N,N'-dimethylacetamide) was added at room temperature 0.005 mole of isoquinoline and 0.04 mole of acetic-formic anhydride, a mixed anhydride. After a few minutes the mixture started to foam and eventually reached a volume more than twice the original. After 30 minutes, the foam had set to a strong polyimide gel, which was then dried for an hour at 300° C. to give a very stiff, strong polyimide foam. A similar result was obtained without isoquinoline.

*Examples 5–9*

The procedure of Example 2 is repeated, using pyromellitamide-acids based on each of the following diamines: 4,4'-diamino-diphenyl methane; 2,2-bis(4-aminophenyl) propane; metaphenylene diamine; 4,4'-diaminodiphenyl sulfone; and nonamethylene diamine. In each case a tough, flame-resistant foam is obtained.

*Examples 10–13*

Similar foamed polyimides are also obtained when the procedure of Example 2 is applied to the polyamide-acids made from 4,4'-diamino-diphenyl ether and each of the following dianhydrides: 3,3',4,4'-diphenyl tetracarboxylic dianhydride; bis(3,4-dicarboxyphenyl) ether dianhydride; and 3,3',4,4'-benzophenonetetracarboxylic dianhydride.

*Example 14*

A portion of the foamed gel of Example 2, containing both acetic anhydride and isoquinoline, is cast onto a copper foil. The composite is heated at about 300° C. until curing of the foam is complete. The foamed polyimide is adhered tightly to the substrate, and the laminate is suitable for the manufacture of light weight flexible printed circuits.

*Example 15*

Sheets of the cellular polyimide of Example 1 are each coated with a layer of a commercial epoxy adhesive called DEN 438, to which has been added an anhydride curing agent as specified by the supplier. To each coated sheet one of the following films is applied, followed by heating to cure the adhesive between the two layers: polyethylene, polypropylene, polyvinyl fluoride, polyethylene terephthalate, the polyimide of pyromellitic dianhydride and bis(4-aminophenyl) ether, the copolymer of tetrafluoroethylene with hexafluoropropylene, the combination of the above polyimide coated with a thin layer of the tetrafluoroethylene/hexafluoropropylene copolymer and the combination of a copper foil coated with the same copolymere.

The polyethylene and polypropylene film laminates are very effective construction materials for use where advantage is taken of the combination of light weight and flame-resistance of the polyimide with the low cost barrier properties of the polyolefin film. An even more versatile and more flame-resistant laminate may be made by bonding a layer of polyolefin film between two layers of cellular polyimide.

The laminate with polyvinyl fluoride is an unusually good material for fire-wall construction. The last five laminates are designed for electrical applications. A superior product for some purposes such as heating elements results from use of a film having an electrically conductive layer of aluminum on its surface, or of a film made from polymer filled with electrically conductive carbon black.

*Example 16*

Cellular polyimide laminates to fiber glass, to nonwoven fabrics of an aromatic polyamide, polyethylene, polypropylene and polyethylene terephthalate are prepared by coating a cellular polyimide as prepared in Example 2 with an epoxy resin as described in Example 15, combining with the fibrous material, and heating under pressure to cure the adhesive. Similar products also result from coating the same substrates continuously with the solution of Example 1 (containing both acetic anhydride and isoquinoline), followed by moderate heating until conversion to polyimide is complete. These laminates are suitable for making fire-resistant thermal insulation.

*Example 17*

The laminate of a polyimide film to a polyimide foam having excellent bond strength is prepared by coating a slab of the foam of Example 2 with a layer of the polyamide-acid solution, followed by heating at 300–400° C. for about one hour.

Example 18

Laminates of polyimide foam to foams of rubber, polyurethane and polytetrafluoroethylene/hexafluoropropylene are prepared by the laminating procedures of Example 16. These products provide good flexible upholstery of reduced flammability for use in furniture.

Example 19

Wires of copper, aluminum and stainless steel are coated with cellular polyimide by extruding over each one the partially gelled foam of Example 2 followed by heating at 300–400° C. Similar products also result from wrapping these same wires with strips of cellular polyimide film and bonding the ends of the strips with the epoxy resin described in Example 15.

Examples 20–21

In Example 20, light weight fabrics suitable for making flame-proof protective clothing result from laminating thin sheets of the cellular polyimide of Example 1 to leather and to cotton cloth, using the epoxy adhesive described in Example 15.

In Example 21, a similar but even more flame-proof fabric-like material is made by coating asbestos cloth with the gelled foam of Example 2 followed by heating at 300–400° C. to cure the foam to a tightly adhering layer of the cellular polyimide.

Example 22

Panels of wood and of fibrous polyethylene terephthalate are made flame-proof by coating them with layers of the foamed gel film of Example 1 containing the acetic anhydride and isoquinoline and heating the coated structure to complete the conversion to polyimide.

Examples 23–27

When each of the following foaming agents is substituted for formic acid in the procedure of Example 2, a similar cellular polyimide product results: oxalic acid, trichloroacetic acid, malonic acid, citric acid and alpha-hydroxybutyric acid.

Having fully disclosed the invention, what is claimed is:

1. A process which comprises mixing at least one diamine with at least one tetracarboxylic acid dianhydride having the structural formula:

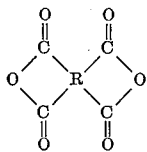

wherein R is a tetravalent radical containing at least 2 carbon atoms, no more than two carbonyl groups of said dianhydride attached to any one carbon atom of said tetravalent radical, in a solvent for at least one of said diamine and said dianhydride under conditions to form a solution of at least one polyamide-acid; adding to said solution an acid anhydride selected from the group consisting of a lower fatty acid anhydride and an aromatic monobasic acid anhydride; thereafter, adding an acid selected from the group consisting of formic acid, oxalic acid, trichloroacetic acid, malonic acid, citric acid and alpha-hydroxy-butyric acid to the solution; agitating the solution until gelation occurs to form a foamed polymeric composition having bubbles dispersed therein; shaping said composition into a shaped cellular article; and, thereafter, heating the shaped article.

2. A process as in claim 1 wherein said diamine is 4,4'-diamino-diphenyl ether.

3. A process as in claim 1 wherein said dianhydride is pyromellitic dianhydride.

4. A process as in claim 1 wherein said solvent is dimethylacetamide.

5. A process as in claim 1 wherein said acid anhydride is acetic anhydride.

6. A process as in claim 1 wherein said acid is formic acid.

7. A process as in claim 1 wherein a tertiary amine is added with said acid anhydride.

8. A process as in claim 7 wherein said tertiary amine is pyridine.

9. A process as in claim 1 wherein a tertiary amine is added with said acid.

10. A process as in claim 9 wherein said tertiary amine is pyridine.

11. A process which comprises mixing at least one diamine with at least one tetracarboxylic acid dianhydride having the structural formula:

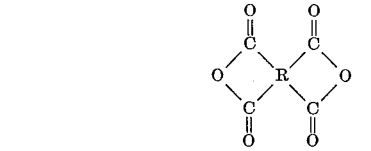

wherein R is a tetravalent radical containing at least 2 carbon atoms, no more than two carbonyl groups of said dianhydride attached to any one carbon atom of said tetravalent radical, in a solvent for at least one of said diamine and said dianhydride under conditions to form a solution of at least one polyamide-acid; adding acetic anhydride to said solution; thereafter adding formic acid and pyridine to said solution to form a foamed polymeric composition having bubbles dispersed therein; shaping said composition into a shaped cellular article; and heating said shaped article.

No references cited.

MURRAY TILLMAN, *Primary Examiner.*

M. FOELAK, *Assistant Examiner.*